Figure 1:
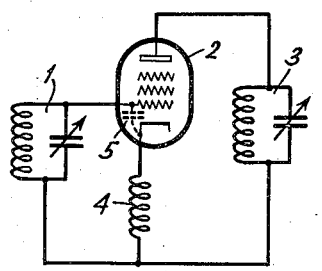

July 4, 1944. M. J. O. STRUTT ET AL 2,352,956
CIRCUIT FOR THE TRANSMISSION OF ELECTRICAL OSCILLATIONS
Filed Jan. 16, 1941    2 Sheets-Sheet 1

INVENTORS
M. J. O. STRUTT, A. V. DER ZIEL
& CORNELIS JAN BAKKER
BY
ATTORNEY

Patented July 4, 1944

2,352,956

UNITED STATES PATENT OFFICE 2,352,956

CIRCUIT FOR THE TRANSMISSION OF ELECTRICAL OSCILLATIONS

Maximiliaan Julius Otto Strutt, Aldert van der Ziel, and Cornelis Jan Bakker, Eindhoven, Netherlands; vested in the Alien Property Custodian Application January 16, 1941, Serial No. 374,712
In the Netherlands January 31, 1940

3 Claims. (Cl. 179—171)

This invention relates to a circuit arrangement for the transmission of electrical oscillations which comprises at least one controlled discharge tube, and has for its purpose to provide means whereby the noise occurring in such circuits can be avoided.

This noise, which is particularly troublesome in the transmission of weak signals, is partly brought about by discharge tubes present in the circuit and partly by the other circuit elements and it may therefore be distinguished in tube noise and circuit noise.

The circuit noise is brought about by spontaneous voltage fluctuations which occur at the ends of each conductor due to thermal propagation of the electrons, and this the stronger according as the conductor concerned has a higher ohmic resistance. Thus, such a noise voltage which is usually referred to as "circuit noise" is set up, for example, across an oscillatory circuit included in the input circuit of a high-frequency amplifying tube.

The tube noise may be distinguished in emission noise and distribution noise. The emission noise is composed of fluctuations of the emission of a cathode, which cathode may be either a thermionic cathode or a secondary-emitting auxiliary cathode or a photo-cathode. The distribution noise is brought about by fluctuations of the current distribution in tubes having more than one positive electrode and consequently occurs, for example, in screen-grid tubes and multi-grid mixing tubes.

The noise generally forms a continuous frequency spectrum, of which only that portion is troublesome which is transmitted by the circuit arrangement. In low-frequency amplifiers trouble is encountered from particular emission noise which is referred to as "flicker" and which is produced due to several parts of the cathode being in turn emissive. This is a cathode noise which is mainly composed of low-frequency components.

It has already been endeavoured to reduce the tube noise by means of special tube constructions. Thus, for example, in screen-grid tubes the distribution noise may be reduced either by limitation of the screen-grid current or by such a geometric arrangement of the electrodes that the emission from definite parts of the cathode contributes exclusively to the screen-grid current and that of other parts contributes exclusively to the anode current.

The present invention provides means whereby the tube noise may be greatly reduced without utilising special tube constructions while in some cases also an improvement in the circuit noise is obtained.

According to the invention, the circuit of an electrode to which flows a noise current has taken from it a noise voltage which is correlated with the said current and which controls the output current of the tube in such phase that the noise current produced in the output circuit is reduced and/or the ratio between the signal current and the noise current in the output circuit is increased as compared to circuits in which damping is produced by known means.

To this effect, an impedance is preferably included in the circuit of an electrode to which flows a noise current, the noise voltage set up across this impedance being supplied in the required phase to a control grid of the tube by means of a second impedance. It is advantageous to choose these impedances so as to contain but small ohmic resistances since otherwise a new source of noise would be introduced.

Another possibility is that the circuit of an electrode to which flows a noise current is coupled by means of a transformer to a control-grid circuit of the tube. In mixing circuits a decrease of the distribution noise may thus be obtained, for example, by including a coil in the circuit of at least one of the screen-grids and by coupling this coil inductively with an oscillatory circuit tuned to the intermediate frequency and included in one of the control-grid circuits.

Finally, for the desired control of the output current, use may alternatively be made, in particular for very high frequencies, of the voltage drop which occurs across an impedance included in the circuit of a control grid due to the influence current which flows to the said control grid.

Figure 2:
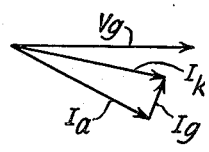
Figure 3:
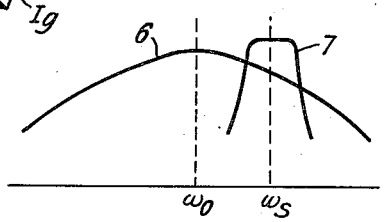
Figure 4:
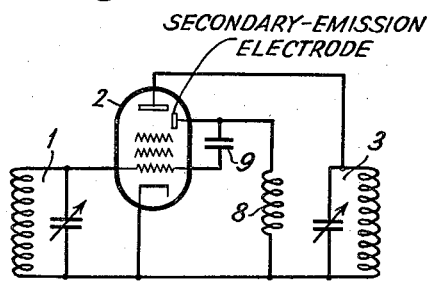
Figure 5:
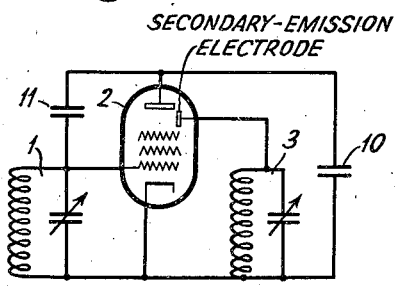
Figure 6:
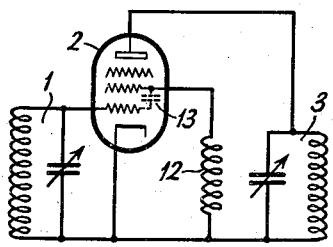
Figure 7:
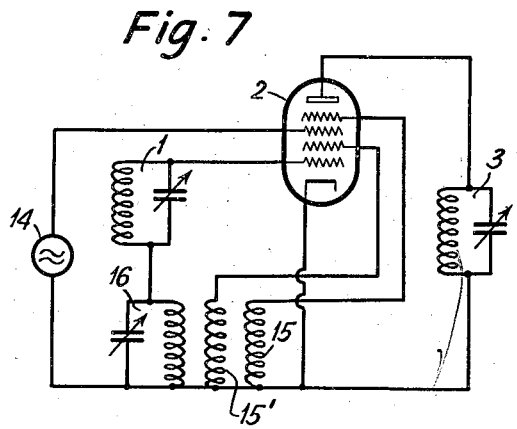
Figure 8:
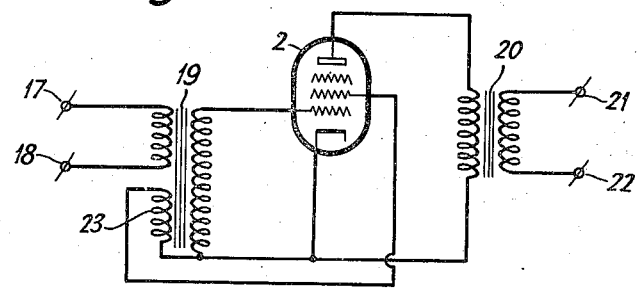
Figure 9:
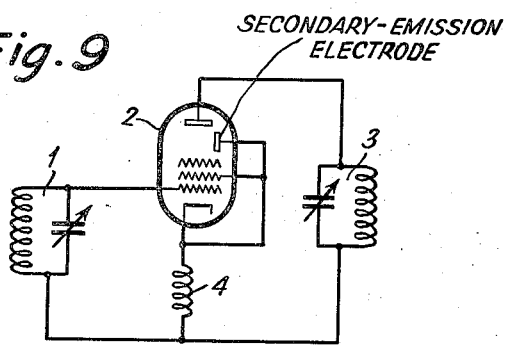
Figure 10:
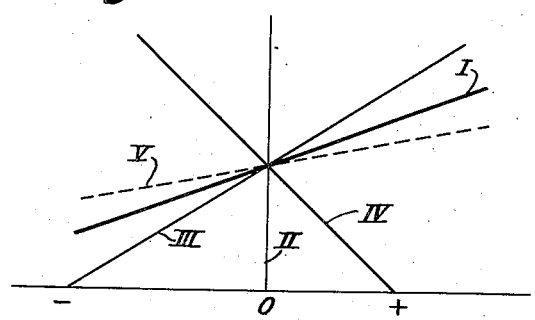

In order that the invention may be more clearly understood and readily carried into effect it will be described more fully by reference to the accompanying drawings showing several practical embodiments thereof, wherein Fig. 1 represents an amplifying circuit utilising means for decreasing the noise current in the output circuit which is correlated with the cathode noise. Fig. 2 is a vector diagram serving to explain a certain phenomena occurring in the operation of Fig. 1. Fig. 3 shows curves serving to explain the operation of the circuit of Fig. 1 in a superheterodyne receiver. Figs. 4 and 5 are modifications of the invention as applied to secondary-emission tubes. Figs. 6 and 7 disclose respectively an amplifying and a mixing circuit for decreasing the distribution noise. Fig. 8 shows a low-frequency amplifying circuit for decreasing the distribution noise. Fig. 9 shows a high-frequency amplifier utilizing a secondary-emission tube with means for reducing simultaneously all the noise components, and Fig. 10 is a diagram of curves for explaining the operation of the several circuits in respect of noise decreasing. For the case of simplicity the sources of direct voltage have been omitted from the figures.

Referring now to Fig. 1 an oscillatory circuit I which is tuned to the signal to be amplified is included in the control-grid circuit of an amplifying tube 2. The anode circuit comprises an oscillatory circuit 3 which is tuned to the same frequency and from which is derived the amplified voltage. According to the invention that part of the cathode lead which is common to the control-grid circuit and the anode circuit comprises a self-induction coil 4. A noise voltage occurs across this coil which is correlated with the cathode noise and leads 90° relatively to the cathode-noise current. This noise voltage brings about a current through the capacity 5 between the control grid and the cathode (which is represented in dotted lines in the figure) which current leads 90° relatively to the voltage across the coil 4 and is consequently in anti-phase with the cathode noise-current. For those frequencies of the noise spectrum which are transmitted by the arrangement, the circuit I practically constitutes an ohmic resistance so that for these frequencies a noise voltage is set up across the circuit I which is in anti-phase with the cathode noise-current. This noise voltage also occurs at the control grid of the tube 2 and thus gives rise to an additional anode current which is in anti-phase with the cathode noise current so that the noise current in the anode circuit which is correlated with the cathode noise is decreased.

In order to obtain the desired effect it is not essential that an inductance should be present in the cathode lead and a capacity between the control grid and the cathode. It is alternatively possible, for example, to provide a capacity in the cathode lead and an inductance between control grid and cathode. The embodiment shown in the figure is, however, the most practical one since the capacity between control grid and cathode is naturally present. On principle, use may be made of any combination of impedances which brings about a noise voltage across the circuit I which is in anti-phase with the cathode noise-current. It is, however, advantageous to use impedances containing but low ohmic resistances since otherwise new sources of noise would be introduced.

The magnitude of the noise voltage set up across the circuit I is determined by the product of the capacity 5 and the inductance of the coil 4. Consequently, the decrease of the noise current in the anode circuit which is correlated with the cathode noise is greater according as the capacity 5 (if desired by means of parallel connection of an additional condenser) and the inductance of the coil 4 are chosen of a higher value.

In this connection it must be borne in mind, however, that not only a noise voltage but also a signal voltage is set up across the coil 4 so that the input circuit has also supplied to it a signal current which is in anti-phase with the signal voltage set up across the said circuit; in other words the presence of the coil 4 brings about an additional damping of the circuit I and consequently the suppression of the cathode noise cannot be continued to a further extent than is admissible in view of the additional damping involved.

The said additional damping brings about a decrease of the signal voltage set up across the input circuit, which results in the signal current in the output circuit being reduced to the same degree as the noise current correlated with the cathode noise.

Consequently, the ratio between signal and noise which occurs in the output circuit remains constant when using the measure described. In other words the invention provides here a means of damping the input circuit without the signal to noise ratio being decreased thereby.

It appears therefrom that it is no use utilising the circuit arrangement of Fig. 1 in those cases in which the damping of the input circuit is desired to be as small as possible but that important advantages are obtained in all those cases in which particular reasons render a greater damping of the input circuit desirable than that which is brought about by the unavoidable losses of the circuit.

Thus, the described circuit is, for example, of great importance for amplifying circuit arrangements transmitting a very wide frequency band, such as are used inter alia in television receivers, since in general in such amplifiers an additional damping of the input circuit is always necessary for obtaining the desired wide transmission range. This additional damping was hitherto obtained either by admitting greater losses in the circuit, or by connecting an ohmic resistance in parallel with the circuit. These usual measures reduce the signal voltage set up across the circuit, whereas the tube noise remains equal so that the ratio between the signal and the tube noise is reduced while in addition in most cases the ratio between the signal voltage set up across the circuit and the circuit noise voltage is reduced. If, on the other hand, the required additional damping according to the invention is obtained by means of an inductance in the cathode lead the ratio between the signal and the tube noise remains constant while in addition a new source of noise is not introduced in the circuit so that also the ratio between the signal voltage set up across the circuit and the circuit noise voltage remains constant. Consequently, both the tube noise and the circuit noise are in this case reduced relatively to the usual circuits, i. e. with a circuit damped with any desired intensity we obtain the same signal to noise ratio as can be obtained with a circuit of very good quality. A maximum freedom of noise is obtained if the damping of the input circuit that is required in connection with the desired transmission range is brought about almost exclusively by the self-induction coil in the cathode lead. The inductance required therefor is in a television receiver of the order of magnitude of 0.1 microhenry.

Another case in which an additional damping of the oscillatory input circuit may be advantageous, and this independently of the required transmission range, occurs with amplifiers for very high frequencies in connection with the so-called "transit-time noise" which phenomenon will be explained hereinafter.

If the transit-time of the electrons between cathode and anode is no longer negligibly small relatively to the period of the oscillations to be transmitted an influence current to the control grid occurs, as can be readily appreciated with reference to the vector diagram represented in Fig. 2. The diagram applies to a triode; in multigrid tubes, however, substantially equal phenomena occur. In the figure $V_g$ represents the control-grid alternating voltage. Due to the finite transit time of the electrons between control grid and cathode, the cathode alternating current $I_k$ lags a little relatively to the control-grid alternating voltage. The anode current $I_a$, if at least the transit time of the electrons between control grid and anode is not greater than half a period of the oscillations to be amplified, is according to its absolute value approximately equal to $I_k$ but shows a greater lag relatively to the alternating voltage of the control-grid. The current $I_g$ which constitutes the geometric difference between the currents $I_a$ and $I_k$ must have flowed to the control grid. The influence current $I_g$ flowing to the control grid contains a component which leads 90° relatively to the control-grid alternating voltage and which can be regarded as a result of an apparent increase of the capacity between control grid and cathode, and a component which is in phase with the control-grid alternating voltage and gives rise to the so-called "transit-time damping." The current $I_g$ contains a noise component which is correlated with the cathode noise and which brings about a noise voltage across the input circuit which is displaced in phase relatively to the cathode-noise-current and gives rise to a material increase of the noise current in the anode circuit which is correlated with the cathode noise. This additional noise current may be referred to as "transit-time noise."

For completeness' sake we may mention that the phenomena which actually occur are more complicated than would appear from the above-mentioned considerations, and this because the speed of the electrons between control grid and cathode is dependent on the instantaneous value of the control-grid voltage. The resulting variations in speed of the electrons give rise to an additional influence current which contributes to the apparent increase of the control grid-cathode capacity and to the "transit-time damping" but does not contain a noise component and consequently does not contribute to the "transit-time noise."

The "transit-time damping" may be interpreted as an apparent resistance connected in parallel with the input circuit and the "transit-time noise" may be regarded as spontaneous voltage fluctuations in this resistance. From this consideration it appears that the said resistance behaves like an ohmic resistance which is approximately at cathode temperature and consequently causes a considerably stronger noise than an ohmic resistance of the same value at room temperature. It is therefore of importance to see to it that the damping of the oscillatory input circuit is not mainly determined by the "transit-time damping," which at a given value of the "transit-time damping" can only be obtained by strong damping of the input circuit in a different manner. This measure, however, is of some use only in the case wherein the increased damping of the input circuit does not in itself decrease the signal to noise ratio. Here use may advantageously be made of the circuit of Fig. 1 in which an increase of damping is obtained without a decrease of the signal to noise ratio.

In the amplification of ultra-short waves ($\lambda < 3$ m.) the above-mentioned considerations lead to the use of tubes which are different from those hitherto used for the amplifications of these waves. One has always taken the view that for a reasonable noiseless amplification the total impedance of the oscillatory input circuit must be higher than the equivalent noise resistance of the tube. The equivalent noise resistance which is a measure of the intensity of the tube noise may be defined as an ohmic resistance which, upon being included in the control-grid circuit of an entirely noiseless tube of the same type, would bring about in the anode circuit a noise current which is equal to the noise current which actually occurs in the anode circuit and which is correlated with the tube noise. On the ground of the above-described rule use has always been made so far of tubes having a minimum possible input damping. With ultra-high frequencies the natural inductance of the cathode lead already brings about a material damping of the oscillatory input circuit, which damping together with the "transit-time damping" practically determines the total impedance of the input circuit. For these ultra-high frequencies therefore use has been made of the so-called "button tubes" in which, due to small dimensions and a small mutual conductance, the damping of the input circuit brought about by the natural inductance of the cathode lead is limited to a minimum. Now, the above-mentioned considerations demonstrate that the damping brought about by the self-induction of the cathode lead does not influence the signal to noise ratio the while in view of the "transit-time noise" it may even be advantageous that this damping is not too weak. Consequently, instead of using the usual "button tubes," use may advantageously be made of other tubes whose dimensions and mutual conductance are chosen such that the natural inductance of the cathode lead brings about a material decrease of the noise current in the output circuit which is correlated with the cathode noise, provided that care is taken to see that the total damping of the input circuit decrease by the damping brought about by the natural inductance of the cathode lead is smaller (for example at least twice smaller) than the reciprocal value of the equivalent noise resistance. When choosing the ratio between the total impedance of the input circuit and the equivalent noise resistance the damping of the input circuit brought about by the inductance of the cathode lead has therefore to be disregarded. In practice this leads to the use of tubes of larger dimensions and/or higher mutual conductance than the "button tubes" while tubes having a space-charge grid between cathode and control grid may be used with particular advantage since in these tubes the "transit-time damping" may be negative and the above-stated prescription may consequently be easily fulfilled. In addition, such tubes permit an adjustment for the electrode biasing voltages in which no influence noise current flows to the control grid so that "transit-time noise" does not occur. Of course, care must always be taken to see that the mutual conductance is sufficiently high to ensure sufficient amplification in spite of the greater damping of the input circuit.

It is known that the "transit-time damping" may be eliminated by including a resistance, which is not bypassed for high frequency currents, in the cathode lead of the tube. It appears that due to the connection of such a resistance in the cathode lead the "transit-time noise" also may be completely compensated. In connection with the complication already mentioned which is brought about by the variations in speed of the electrons between cathode and control grid a higher resistance is necessary for compensating the "transit-time noise" than that which is required for compensating the "transit-time damping." The effect of the compensation of the "transit-time noise" obtained in this manner is, however, decreased due to the resistance included in the cathode lead on the one hand constituting a new source of noise and on the other hand decreasing the effective mutual conductance of the tube due to the fact that a negative feed-back is brought about.

In circuit arrangements for the transmission of oscillations of very high frequencies in which the transmission range of the input circuit is considerably wider than the transmission range of the whole circuit efficient use may be made for compensating the cathode noise of the noise voltage which occurs across the input circuit due to the above-mentioned influence phenomena. As appears from Fig. 2, the influence current flowing to the control grid leads almost 90° in phase relatively to the cathode current. Now, by slightly detuning the input circuit relatively to the signal to be transmitted it may be achieved that for those frequencies of the noise spectrum which fall within the transmission range of the circuit the input circuit behaves like a small capacity so that for these frequencies a noise voltage occurs across the input circuit which is in anti-phase with the cathode noise-current. This noise voltage gives rise to an additional anode current which is in anti-phase with the cathode noise-current so that the total noise current in the anode circuit which is correlated with the cathode noise is decreased and may even be reduced to nought. A further explanation thereof will be given with reference to Fig. 3 in which curve 6 represents the resonance curve of the input circuit, whereas curve 7 represents the materially narrower transmission range of the circuit which is determined by the following stages of the circuit, in a superheterodyne receiver, for example, mainly determined by the intermediate-frequency amplifier. As appears from the figure, the resonance frequency $\omega_0$ of the input circuit has been chosen to be slightly lower than the signal frequency $\omega_s$ falling within the transmission range so that the input circuit behaves for the signal frequency as a small capacity. The amplification of the signal is but slightly impaired by the detuning of the input circuit since the transmission range of the input circuit is much larger than the required transmission range. A troublesome distortion of the signal, which may occur due to the detuning, may be compensated by a similar detuning in opposite sense in one of the following stages in which the signal has already been amplified to such extent that the noise no longer plays a part.

The fact that the influence current flowing to the control grid is not exactly shifted in phase by 90° relatively to the cathode current may be taken into account by choosing the damping of the input circuit (including the "transit-time damping") of such value that the noise voltage set up at the control grid has exactly the phase required for the compensation. In practice the complete compensation of the cathode noise requires such a detuning of the input circuit as to represent a capacity of a few micro-microfarads, for example 2 to 3 micro-microfarads.

In the circuit described the cathode noise and the "transit-time noise" neutralise one another while practically the signal intensity is not decreased. It is evident that consequently a very effective decrease in noise is achieved. The circuit concerned has, however, the disadvantage that the simultaneous decrease of noise currents which originate from other noise sources (distribution noise and secondary-emission noise, if any) involves some difficulty, as will hereinafter be set out more fully. Besides, this method of noise compensation is less suitable in circuits which have to transmit a wide frequency-band such as, for example, in television receivers since in this case curve 7 of Fig. 3 will generally have approximately the same width as curve 6 so that a detuning of the input circuit relatively to the frequency to be transmitted is practically no longer possible.

In the various circuits described above the noise voltage required for decreasing the cathode noise was derived either from the cathode circuit or from the control-grid circuit. For completeness' sake it may be remarked that the current of screen grids which may be available in the tube, the anode current and the current of secondary-emission electrodes, if any, as well as the influence currents flowing to any further grids with negative bias contain all of them a noise component which is correlated with the cathode noise so that on principle a noise voltage may be derived from the circuits of any of these electrodes, which voltage may be used for decreasing the cathode noise. Furthermore, the control of the output current by the said noise voltage, due to which the said decrease in noise is achieved, need not take place by supplying this noise voltage to the input control grid, but for this purpose use may alternatively be made of another control grid.

A decrease of the above-mentioned "flicker" in low-frequency amplifiers may be achieved in a similar manner as a decrease of the normal cathode noise, that is to say, for example, by deriving a voltage correlated with the "flicker" from an impedance included in the cathode lead and by supplying this voltage in suitable phase to the control grid. The circuit of Fig. 1 is less suitable for this purpose since the inductance in the cathode lead required in this case would have too high a value. In the case described use will preferably be made of a transformer for supplying the "flicker" voltage to the control grid.

Fig. 4 shows an amplifying circuit having a secondary emission tube and comprising means for decreasing the secondary-emission noise. This is effected in a similar manner as decreasing of the cathode noise in the circuit arrangement of Fig. 1, viz. by connecting a self-induction coil 8 in the circuit of the secondary-emission electrode, a noise voltage correlated with the secondary-emission noise occurring across the said coil and being supplied through a condenser 9 to the control grid in such phase that the noise current in the anode circuit which is correlated with the secondary-emission noise is decreased. The natural capacity between the secondary-emission electrode and the control grid is generally too low for this purpose so that a condenser must be interposed between the secondary-emission electrode and the control grid.

In the circuit arrangement of Fig. 4, as in the circuit arrangement of Fig. 1, an additional damping of the input circuit 1 is brought about, resulting in a decrease not only of the noise current but also of the signal current. However, while in the circuit arrangement of Fig. 1 the signal to noise ratio remained constant, the signal to noise ratio will in this case increase, according as the noise current is decreased. On principle the secondary-emission noise therefore may be completely suppressed. This is due to the fact that the noise currents in the anode circuit and in the circuit of the secondary-emission electrode, which noise currents are correlated with the secondary-emission noise, are equal to one another, whereas the signal currents in the two circuits are different. Consequently, the ratio between the signal and the secondary-emission noise is different in the two circuits so that in the case of complete suppression of the secondary-emission noise a signal remains all the same. On the other hand, the ratio between the signal and the cathode noise in the anode circuit is equal to that in the cathode circuit so that in the case of complete suppression of the cathode noise by means of the circuit arrangement of Fig. 1 the signal would also disappear.

In the case of complete suppression of the secondary-emission noise the amplification in the circuit arrangement of Fig. 4 is decreased exactly to such extent that the anode current is equal to the current which would be obtained if the tube did not comprise a secondary-emission electrode. In this case therefore use may as well be made of a tube without secondary emission. Partial suppression of the secondary-emission noise with the aid of the circuit arrangement of Fig. 4 is, however, advantageous in all those cases in which greater amplification is desired than that which can be obtained without secondary emission while the maximum amplification which may be obtained with a secondary-emission tube is not required.

In addition, the circuit arrangement of Fig. 4, like that of Fig. 1, provides the possibility of increasing the damping of the input circuit without a decrease of the signal to noise ratio. Consequently, the use of the circuit concerned offers advantages in all those cases wherein for particular reasons a greater damping of the input circuit is desired than that brought about by the unavoidable losses of this circuit.

Another method of decreasing the secondary-emission noise is illustrated in Fig. 5 in which the output circuit 3 is included in the circuit of the secondary-emission electrode while the anode circuit comprises a condenser 10 across which occurs a noise voltage which is correlated with the secondary-emission noise. This noise voltage is supplied in the desired phase to the control grid through a condenser 11. Instead of an inductance, as in the circuit arrangement of Fig. 4, in this case a condenser 10 must be provided in the anode circuit for decreasing the secondary-emission noise since the phase of the secondary-emission noise in the anode circuit is opposite to that in the circuit of the secondary-emission electrode. Complete suppression of the secondary-emission noise as is possible in the circuit arrangement of Fig. 4, cannot be achieved in the circuit arrangement of Fig. 5. The latter, however offers the advantage that the decrease in noise is not dependent on the signal frequency, which is the case in the circuit arrangement of Fig. 4.

It may be mentioned that in the circuit arrangements of Figs. 4 and 5 the cathode noise is also decreased since the current of the secondary-emission electrode and the anode current both comprise a noise component which is correlated with the cathode noise.

With tubes having more than one secondary-emission electrode it must be considered that each of the secondary-emission electrodes constitutes an independent source of noise. The current of the last secondary-emission electrode and the anode current also comprise a noise component which is correlated with the noise of the preceding secondary-emission electrodes so that the total secondary-emission noise may be decreased by means of a noise voltage derived from the anode circuit or from the circuit of the last secondary-emission electrode. It is also possible to decrease the noise of each secondary-emission electrode separately in the manner as illustrated in Fig. 4.

The secondary-emission noise may also be decreased by arranging for a noise voltage correlated with the secondary-emission noise to be fed back to another control grid instead of to the input control grid.

Fig. 6 shows a circuit arrangement comprising means for suppressing the distribution noise. This figure illustrates an amplifying circuit utilising a screen grid tube and in which the distribution noise is produced by fluctuations in the current distribution between screen grid and anode. The screen-grid circuit comprises an inductance 12 across which occurs a noise voltage correlated with the distribution noise. This noise voltage is supplied to the control grid through the screen grid-control-grid capacity 13 which is shown in dotted lines, in such phase that the noise current in the anode circuit which is correlated with the distribution noise is decreased. While in the above-described circuits an additional damping of the input circuit was always brought about when decreasing the emission noise, the decrease of the distribution noise involves a reduction of the damping of the input circuit. This is due to the fact that the distribution noise currents in the anode circuit and the screen-grid circuit are in anti-phase with one another (an accidental increase of the anode current results in an equal decrease of the screen-grid current), whereas the signal currents in the two circuits have the same phase. Consequently, there is no objection to choosing the inductance 12 and the capacity 13 of such value that the distribution noise is completely suppressed. It is true that, since the noise currents in the anode circuit and in the screen-grid circuit which are correlated with the cathode noise, have the same phase, the cathode noise is slightly increased due to the decrease of the distribution noise. This disadvantage may be eliminated, if need may be, by decreasing at the same time the cathode noise with the aid of the method described with reference to Fig. 1.

In a television receiver the inductance of the coil 12 required for complete compensation of the distribution noise is of the order of 0.25 microhenry.

Fig. 7 shows a mixing circuit utilising means for decreasing the distribution noise. The received signal occurs in the input circuit 1 which is included in the circuit of the first control grid of the hexode 2. The circuit of the second control grid comprises the local oscillator 14 which is indicated diagrammatically. The anode circuit comprises an oscillatory circuit 3 which is tuned to the intermediate frequency. In order to decrease the distribution noise, coils 15 and 15' are included in the circuits of the two screen grids and are inductively coupled with an oscillatory circuit, which is tuned to the intermediate frequency and included in the circuit of the first control grid, in such phase that the noise current in the anode circuit which is correlated with the distribution noise decreases. The distribution noise currents in the circuits of the two screen grids are in anti-phase with the corresponding distribution noise currents in the anode circuit. The signal current in the anode circuit is in phase with the signal current in the circuit of the outer-most screen grid but in anti-phase with the signal current in the circuit of the inner screen grid. Consequently, the feed-back brought about by the coil 15 will cause the signal current in the anode circuit to increase, whereas the feed-back brought about by the coil 15' decreases the signal current in the anode circuit. The coil 15 thus causes for the signal a positive feed-back and the coil 15' a negative feed-back. It ensues therefrom that the distribution noise brought about by the outermost screen grid may be completely suppressed, whereas the distribution noise which is brought about by the intermost screen grid can be reduced but cannot be completely suppressed. Suitable proportioning of the two feed-back couplings exists, for example, when the feed-back by means of the coil 15 is so great that the distribution noise which is brought about by the outer screen grid is exactly suppressed while the feed-back by means of the coil 15' is so chosen that the signal is fed back as strongly positive (by the coil 15) as negative (by the coil 15'). The signal intensity in the anode circuit is in this case equally great as that without noise compensation while the noise in the anode circuit is materially reduced.

Instead of using separate coils 15 and 15', use may alternatively be made of a common coil in which the two screen-grid circuits are preferably connected to different tappings. When using a tube in which the two screen grids are internally connected through, the latter embodiment is not possible so that in this case; an optimum decrease in noise cannot in general be obtained.

The circuit 16 preferably has an impedance of about 1000 ohms.

On principle, instead of using the described feed-back by means of the intermediate-frequency circuit 16, use might also be made of aperiodic feed-back. However, this involves the disadvantage that the received oscillations and the local oscillations also are fed back, due to which the good operation of the mixing tube might be disturbed. The described selective feed-back is consequently preferable.

Fig. 8 shows a low-frequency amplifying circuit comprising means for decreasing the distribution noise. The voltage to be amplified is supplied by means of terminals 17 and 18 to the primary winding of the input transformer 19 whose secondary winding is connected between the control grid and the cathode of the amplifying tube 2. The anode circuit of the tube comprises the primary winding of an output transformer 20 whose secondary winding is connected to output terminals 21 and 22. For decreasing the distribution noise, the input transformer 19 comprises an additional winding 23 which is included in the screen-grid circuit and which induces a noise voltage of the correct phase, which is correlated with the distribution noise, in the secondary winding of the input transformer.

The described methods for decreasing distribution noise and emission noise may be jointly used so that a decrease of the distribution noise and a decrease of one or more kinds of emission noise is obtained simultaneously. It is also possible to reduce all the noise components together by supplying a noise voltage derived from the anode circuit in the correct phase to a control grid. An example of the last-mentioned method is illustrated in Fig. 9. This figure shows a high-frequency amplifier utilising a secondary-emission tube. That part of the cathode lead which is common to the anode circuit and the control-grid circuit comprises an inductance 4. The secondary-emission electrode and the screen grid are connected for high frequency to that extremity of the coil 4 which is connected to the cathode so that the secondary-emission noise current and the distribution noise current flow through the coil 4. Consequently, a noise voltage occurs across the coil 4 which voltage is correlated with the noise of all the sources of noise present in the tube. This noise voltage is transferred through the control grid-cathode capacity to the input control grid, and this in such phase that all the noise components are decreased.

With regard to the possibilities of application of the various circuit arrangements it may be remarked that the circuit arrangements according to Figs. 1, 4, 6 and 9 are particularly adapted for wave-lengths below 30 metres, for which wave-lengths the inductances required for the decrease in noise can be easily realised. Furthermore, the decrease in noise obtained is variable with frequency so that in the case of tunable amplifiers an optimum result is obtained for one frequency only; the frequency chosen therefor is preferably the highest frequency of the tuning range.

In view of the foregoing, for frequencies below 10 megacycles/sec. ($\lambda > 30$ metres) and with tunable amplifiers use is preferably made of circuit arrangements in which the noise voltage required for the decrease in noise is supplied to a control grid by means of a transformer, such as is the case, for example, in the circuit arrangements of Figs. 7 and 8. The circuit arrangements of Fig. 5, whose operation with regard to the decrease in noise is independent of frequency can also very well be used in the two last-mentioned cases.

In the circuit arrangements of Figs. 1, 4, 5, 6 and 9 it is essential for correct operation that the input circuit constitutes at least approximately an ohmic resistance for the frequencies to be transmitted, in other words that the input circuit is tuned to the signal to be transmitted. The circuit arrangement described with reference to Figs. 2 and 3, in which use is made of the influence current flowing to the control grid and in which the input circuit is detuned relatively to the signal, can therefore only be combined which one of the circuits of Fig. 4, 5 or 6, if at the same time a phase correction is effected in order to give the correct phase to the noise voltage which is fed back to the control grid from the secondary-emission electrode or from the screen grid. This phase correction generally requires the use of ohmic resistances which constitute new noise sources.

When transmitting very high frequencies, for which the transit-time of the electrons is no longer negligibly small relatively to the period of the oscillations to be transmitted, it is further necessary to consider the phase displacements of the noise currents occurring in the circuits of the various electrodes which are brought about by the transit-times.

The operation of the various described circuit arrangements for noise decreasing is illustrated diagrammatically in Fig. 10. In this figure the signal current and the various noise currents in the output circuit are represented as a function of the intensity of the feed-back used to decrease the noise. For the sake of simplicity it has been assumed that all the currents have a linear variation with the intensity of the feed-back, which, of course, cannot always be the case in reality.

Line I represents the magnitude of the signal current in the output circuit. The same line also applies to the intensity of the cathode noise-current in the output circuit with the circuit arrangement of Fig. 1, since in this circuit arrangement the signal to noise ratio does not vary with the intensity of the feed-back. Line II represents the intensity of the cathode-noise-current in the output circuit for the case described with reference to Figs. 2 and 3 viz. that the cathode noise is decreased by detuning the input circuit. In this case the cathode noise-current in the output circuit can be reduced to nought while the signal current practically remains constant. Line III applies to the intensity of the secondary-emission noise current in the output circuit in the case of the circuit arrangement of Fig. 4. In this circuit arrangement the secondary-emission noise may be reduced to nought but only at the cost of a considerable decrease of the signal current. Line IV represents the intensity of the distribution noise-current in the output circuit with the circuit arrangements of Figs. 6 and 8. The distribution noise may be completely reduced to nought, in which event the signal current increases.

In the case of the circuit arrangement of Fig. 7 the intensity of the distribution noise-current brought about by the outer screen-grid may be represented by line IV while the line which indicates the intensity of the distribution noise-current brought about by the innermost screen-grid coincides with line I. On principle, the possibility must be considered that the intensity of a given noise current in the output circuit varies as represented by the dotted line V. In this case the noise current will increase with increasing positive feed-back but to a less high degree than the signal current. Consequently, in order to obtain an improvement in the signal to noise ratio in the output circuit, the intensity of the noise current would in this case have to be increased.

The question arises as to whether in the various circuit arrangements described the amplification may be controlled by variation of the bias of one of the electrodes of the tube without disturbing the decrease in noise obtained. It is readily understood that in the circuit for decreasing the cathode noise the result obtained does not vary if the cathode current remains constant. From a calculation it appears that the same condition applies to the case of the decrease of the distribution noise; in this case also the decrease in noise is not influenced, as long as the cathode current remains constant during the control. Consequently, in the circuit arrangements of Figs. 1, 6 and 8 the amplification may be controlled by variation of the bias of the suppressor grid.

It appears that in the case of the decrease of the secondary-emission noise, such as for example in the circuit arrangement of Fig. 4, the condition must be fulfilled that the primary current which flows to the secondary-emission electrode remains constant during the control. Consequently, in this case the amplification may be controlled by variation of the bias of the secondary-emission electrode.

In conclusion, some attention should be paid to the problem in what manner the aerial of a receiver must be coupled to the input circuit in the case that in the first stage of the receiver use is made of one of the noise-decreasing circuit arrangements described.

It is usually assumed that for obtaining an optimum signal to noise ratio the aerial must be coupled to the input circuit in such manner that a maximum signal voltage is set up at the control grid of the first tube. For this purpose, in the usual transformer coupling between the aerial circuit and the input circuit the secondary transformed aerial resistance $R_a$ must be rendered equal to the circuit impedance $R_k$. The same condition also applies to other aerial couplings in which the secondary transformed aerial resistance is always to be understood to mean the reciprocal value of the damping exerted by the aerial on the input circuit. A fulfilment of this condition, however, has the effect of obtaining a maximum signal to noise ratio only in the case that the tube noise is highly predominant over the circuit noise. It is also clear indeed that, if only the tube noise need be taken into account, a maximum signal to noise ratio may be obtained by providing for a maximum control-grid voltage.

If, on the other hand, the circuit noise will be largely predominant to the tube noise so that solely circuit noise has to be considered, a maximum signal to noise ratio will be obtained by connecting the aerial directly to the control grid since in this case the signal to noise ratio which occurs in the aerial may only be increased by the addition of further circuit elements. Consequently, in this case the optimum signal to noise ratio would be obtained by a tightest possible coupling between the aerial and the input circuit, that is to say the condition for a maximum freedom of noise reads: $Ra=0$.

In practice both the tube noise and the circuit noise must be considered and consequently the optimum signal to noise ratio is obtained for a value of $R_a$ which is comprised between the two stated values. It appears that the optimum aerial coupling is determined by the equation;

$$R_a = \frac{R_k}{\sqrt{1+\frac{R_k}{R_b}}}$$

in which $R_b$ represents the equivalent noise resistance of the tube. In cases in which the "transit-time damping" plays an important part, a correction will still have to be made in this relation.

Now, it was already demonstrated above that the connection of an inductance in the cathode lead for the purpose of decreasing the cathode noise results in a variation of the damping of the input circuit, whereas the signal to noise ratio remains constant. Consequently, it will be clear that in calculating $R_k$ in the above-stated relation the damping of the circuit brought about by the inductance in the cathode lead should be disregarded. It appears that the same remark applies to increases and reductions of damping which are brought about by the arrangement of means for decreasing secondary-emission noise and distribution noise. Consequently, in the above-stated equation there must be filled in for $R_k$ the reciprocal value of the total damping of the input circuit decreased by the increases or reductions of damping which are brought about by noise decreasing measures, or in other words, in calculating $R_k$ only the natural losses of the circuit, if necessary together with damping resistances included in series or in parallel in the circuit, and the "transit-time damping" must be considered.

What we claim is:

1. A circuit arrangement for the transmission of electrical oscillations comprising an electron discharge tube provided with at least a cathode, a signal grid and an anode, input and output circuits connected respectively to the signal grid and anode, and only an inductance having a minimum resistance through which there flows a noise current connected to the cathode and included in both the input and output circuits, there being derived from across said inductance a noise voltage which is correlated with said current and which brings about a noise voltage across the input circuit in anti-phase with the cathode noise current thereby increasing the damping of the input circuit without decreasing the signal to noise ratio.

2. A circuit arrangement in accordance with the invention defined in claim 1, wherein the noise voltage derived from across the inductance is fed to the signal grid through the inherent tube capacity between signal grid and cathode.

3. A circuit arrangement for the transmission of electrical oscillations comprising an electron discharge tube provided with at least a cathode, a signal grid and an anode, input and output circuits connected respectively to the signal grid and anode, and only an unby-passed inductance coil having a minimum resistance connected to the cathode and common to the input and output circuits, whereby the band width of the input circuit is increased by the damping effect of the coil and noise voltages are reduced by the degenerative action of the coil, with the result that the signal to noise ratio is improved as compared to a circuit whose band width is increased by association therewith of ohmic resistance which has no accompanying degenerative action of the noise voltages.

MAXIMILIAAN JULIUS OTTO STRUTT.
ALDERT van der ZIEL.
CORNELIS JAN BAKKER.